United States Patent
Broer et al.

[11] Patent Number: 5,825,444
[45] Date of Patent: Oct. 20, 1998

[54] ILLUMINATION SYSTEM USING CHOLESTERIC POLARIZER, LINEAR POLARIZER FOR SUCH ILLUMINATION SYSTEM AND DISPLAY DEVICE COMPRISING SUCH AS ILLUMINATION SYSTEM

[75] Inventors: Dirk J. Broer; Johannes A. M. M. Van Haaren; Grietje N. Mol; Frans Leenhouts, all of Eindhoven, Netherlands

[73] Assignee: U.S. Philips Corporation, New York, N.Y.

[21] Appl. No.: 752,364

[22] Filed: Nov. 19, 1996

[30] Foreign Application Priority Data

Nov. 22, 1995 [EP] European Pat. Off. .............. 95203209

[51] Int. Cl.⁶ .............................. G02F 1/1335; G02F 1/13
[52] U.S. Cl. ................................. 349/98; 349/62; 349/175
[58] Field of Search .................................. 349/98, 175, 62

[56] References Cited

U.S. PATENT DOCUMENTS

| | | | |
|---|---|---|---|
| 5,506,704 | 4/1996 | Broer et al. | 359/63 |
| 5,721,603 | 2/1998 | De Vaan et al. | 349/175 |

FOREIGN PATENT DOCUMENTS

| | | |
|---|---|---|
| 0606939 | 7/1994 | European Pat. Off. . |
| 0606940 | 7/1994 | European Pat. Off. . |
| WO96/02016 | 1/1996 | WIPO . |

*Primary Examiner*—Anita Pellman Gross
*Attorney, Agent, or Firm*—John C. Fox; Dwight H. Renfrew

[57] ABSTRACT

The Application relates to an illumination system comprising a fluorescent lamp and a broadband, cholesteric polarizer. Such a polarizer contains a layer of a polymeric material having a cholesteric order, which material is ordered in such a way that the axis of the molecular helix extends at right angles to the layer. The broadband character of the polarizer is obtained by causing the pitch of the molecular helix to increase from a minimum value at a first surface of the cholesteric layer to a maximum value at the second surface of the layer. In accordance with the invention, the polarizer should be positioned in the illumination system in such a manner that the cholesteric layer is directed towards the fluorescent lamp with its first surface. In addition, the value of the product $p_{max} \cdot n_e$ of the maximum value of the pitch in the cholesteric layer $p_{max}$ and of the extraordinary refractive index $n_e$ must range between 0.61 micron and 0.76 micron. By virtue of these measures, the illumination system has a surprisingly low viewing-angle dependence of the lightness and the color. The Application further relates to a linear polarizer for use in this illumination system as well as to a display device which comprises such a linear polarizer.

19 Claims, 4 Drawing Sheets

1

2

3

4

ILLUMINATION SYSTEM USING CHOLESTERIC POLARIZER, LINEAR POLARIZER FOR SUCH ILLUMINATION SYSTEM AND DISPLAY DEVICE COMPRISING SUCH AS ILLUMINATION SYSTEM

BACKGROUND OF THE INVENTION

The invention relates to an illumination system comprising a fluorescent lamp and a broadband, cholesteric polarizer. The invention also relates to a linear polarizer which can suitably be used in such an illumination system. The invention further relates to a display device comprising such an illumination system.

An illumination system of the type mentioned in the opening paragraph is known per se from European Patent Application EP-A 606.940, in the name of the current Applicant. In FIG. 8 of said publication, a description is given of an illumination system in the form of a housing comprising three fluorescent lamps and a broadband, cholesteric polarizer. Fluorescent lamps are provided with a layer of a fluorescent material, which is generally composed of three different fluorescent compounds which each have a specific fluorescence wavelength. In general, mixtures of fluorescent compounds are used which have the most important fluorescence bands at approximately 435 nm (blue), approximately 545 nm (green) and approximately 610 nm (red). The bandwidth of the emission spectrum of fluorescent lamps is much smaller than that of incandescent lamps or standard sunlight.

The polarizer used in the known illumination system comprises a layer of a polymeric material having a cholesteric order, the so-called cholesteric layer. By means of this layer, the polarization state of light passing through the polarizer is influenced. The polymeric material of the cholesteric layer is ordered in such a way that a molecular helix can be distinguished, the axis of this helix extending at right angles to said cholesteric layer. The above-described polarizer has a large bandwidth because the pitch of the molecular helix increases from a minimum value at a first surface of the cholesteric layer to a maximum value at the second surface of the layer. In the case of narrow-band polarizers, the pitch length of the molecular helix is substantially constant throughout the layer.

In experiments it has been established that the known illumination system with the fluorescent lamps has an important drawback regarding the viewing-angle dependence of the system. It has been found that under many circumstances there is a relatively large variation in the lightness and color of the transmitted light when the viewing direction relative to the system is changed. This drawback is problematic, in particular, if such an illumination system is used in a display device.

OBJECTS AND SUMMARY OF THE INVENTION

It is an object of the invention to overcome the above-mentioned drawback. The invention more particularly aims at providing an illumination system and a display device having a small viewing-angle dependence of the lightness and the color. The invention further aims at providing a linear polarizer, which enables these objects to be achieved in a display device and in an illumination system.

These and other objects are achieved by means of an illumination system which comprises a fluorescent lamp and a broadband, cholesteric polarizer with a layer of a polymeric material having a cholesteric order, said material being ordered in such a manner that the axis of the molecular helix extends at right angles to the layer, and the pitch of the molecular helix increasing from a minimum value at a first surface of the cholesteric layer to a maximum value at the second surface of the layer, characterized in that the polarizer is positioned in the illumination system so that the cholesteric layer faces the radiation source with its first surface and that the value of the product $p_{max} \cdot n_e$ of the maximum value of the pitch in the cholesteric layer $p_{max}$ and of the extraordinary refractive index $n_e$ ranges between 0.61 micron and 0.76 micron.

The invention is inter alia based on the experimentally gained insight that the bandwidth of the cholesteric polarizer should be properly adapted to the bandwidth of the emission spectrum of the fluorescent lamp(s) used. In the case of a properly adapted polarizer, the viewing-angle dependence of the illumination system is found to be surprisingly low as regards the intensity and discoloration of the obliquely transmitted light. This applies even if the acceptance angle is 30° or more relative to the normal to the cholesteric layer.

It has been found that the product $p_{max} \cdot n_e$ of the cholesteric layer must be properly attuned to the bandwidth of the fluorescent lamps used. On the one hand, the value of this product should be maximally 0.76 micron. At larger values the viewing-angle dependence of the intensity of the transmitted light assumes unacceptably large values. On the other hand, the value of this product should be minimally 0.61 micron. At smaller values, discoloration in the case of obliquely incident light with an acceptance angle, for example, of more than 30° assumes undesirably large values. Optimum adaptation of the cholesteric layer to conventional fluorescent lamps is obtained if the above-mentioned product ranges between 0.63 micron and 0.74 micron. Conventional fluorescent lamps are to be understood to mean herein lamps whose most important fluorescence bands lie, approximately, at 435 nm, 545 nm and 610 nm.

In the illumination system in accordance with the invention, the broadband, cholesteric polarizer should be positioned relative to the radiation source in such a manner that the surface of the polarizer with the smallest pitch is directed towards the fluorescent lamp. It has been found that, in this configuration, undesirable coloration of the light emanating at an angle is considerably less than in the configuration in which the radiation source is situated on the other side of the polarizer. Said coloration occurs if the system is viewed under a (polar) angle which is larger than or equal to a specific, minimum value. In addition, experiments have revealed that the configuration in accordance with the invention has a much smaller viewing-angle dependence of the intensity of the light passed than the configuration in which the surface of the polarizer with the largest pitch is directed towards the fluorescent lamp.

It is noted that in the International Patent Application WO 96/02016, in the name of the current Applicant, a description is given of an illumination system comprising a radiation source and a broadband, cholesteric polarizer. In this system, the surface of the polarizer having the maximum pitch length is directed towards the radiation source.

An advantageous embodiment of the illumination system in accordance with the invention is characterized in that the illumination system also comprises a quarter-lambda plate which is situated at the side of the polarizer facing away from the light source. By virtue of the presence of this quarter-lambda plate, the light emanating from the illumination system is linearly polarized. In the absence of such a quarter-lambda plate, circularly polarized light is obtained. Particularly, illumination systems producing linearly polarized light are suitable for use in commercially available display devices. It is noted that a quarter-lambda plate is to be understood to mean herein a birefringent layer, which may or may not be laminated, whose optical retardation ranges from 125 to 150 nm at a wavelength of approximately 550 nm.

A further advantageous embodiment of the illumination system in accordance with the invention is characterized in that the quarter-lambda plate is situated on the second surface of the broadband polarizer. By virtue of the fact that the quarter-lambda plate and the polarizer are provided on each other so as to be in direct contact with each other, the illumination system in accordance with this embodiment of the invention exhibits lower reflection losses.

A further interesting embodiment of the illumination system in accordance with the invention is characterized in that the quarter-lambda plate is made of a foil of oriented polymeric material. In theory, use can be made of quarter-lambda plates which are made from inorganic materials, such as calcite. However, the difference between the ordinary and the extraordinary refractive index of this material is relatively large. As a result, the thickness of the quarter-lambda plate must be approximately 0.8 micrometer in order to be suitable for an illumination system for use in the visible portion of the spectrum. In practice, however, such a small thickness for plates having a surface area of 10 cm² or more can hardly, or perhaps not at all, be realized. In addition, quarter-lambda plates based on oriented foils are much cheaper than quarter-lambda plates made from inorganic materials. Such oriented foils can be obtained by polymerizing specific monomer mixtures on an oriented surface to form a foil. Such a surface can be oriented by rubbing it in a specific direction. The manufacture of such foils usually takes place by stretching a finished foil in a specific direction. Very good results were obtained by using a stretched foil of substituted or unsubstituted polystyrene or a copolymer thereof. Satisfactory results were also obtained by using a foil of polycarbonate.

In a further favourable embodiment, the inventive illumination system also comprises a dichroic polarizer which is situated on the side of the quarter-lambda plate facing away from the broadband, cholesteric polarizer. The presence of such a polarizer leads to a higher contrast of the relevant illumination system. This dichroic polarizer is preferably situated on the quarter-lambda plate. This configuration leads to lower reflection losses of the incident light.

The invention also relates to a linear polarizer for use in an illumination system. This linear polarizer is characterized in accordance with the invention in that it comprises a broadband, cholesteric polarizer as well as a quarter-lambda plate, said polarizer including a layer of a polymeric material having a cholesteric order, said material being ordered in such a manner that the axis of the molecular helix is directed at right angles to the layer, and the pitch of the molecular helix increasing from a minimum value at a first surface of the cholesteric layer to a maximum value at the second surface of the layer, the quarter-lambda plate being situated on the second surface of the polarizer, and the value of the product $p_{max} \cdot n_e$ of the maximum value of the pitch in the cholesteric layer $p_{max}$ and of the extraordinary refractive index $n_e$ ranging between 0.61 micron and 0.76 micron.

In the linear polarizer in accordance with the invention, the broadband, cholesteric polarizer is positioned relative to the quarter-lambda plate in such a manner that the surface of the polarizer having the largest pitch physically contacts said plate. The use of a linear polarizer of this configuration in an illumination system comprising a conventional fluorescent lamp ensures that the undesirable discoloration of the emanating light as a function of the viewing angle is considerably less than in the configuration in which the cholesteric polarizer physically contacts the quarter-lambda plate with its opposite surface. In addition, experiments have revealed that in the inventive configuration of the linear polarizer, the viewing-angle dependence of the intensity of the transmitted light of the illumination system is much smaller than in the other configuration. This small viewing-angle dependence can be attributed, to a large extent, to the fact that the bandwidth of the polarizer is adapted to the bandwidth of the fluorescent lamp used.

Another favorable embodiment of the linear polarizer in accordance with the invention is characterized in that the quarter-lambda plate is made of a foil of an oriented polymeric material. The use of such synthetic resin foils enhances the ease of manufacture because this type of foils can be processed relatively easily. Moreover, such foils are relatively cheap. A linear polarizer which functions very satisfactorily is obtained if stretched foils of substituted or unsubstituted polystyrene or copolymers thereof are used. Good results can also be obtained by using polycarbonate.

Yet another advantageous embodiment of the linear polarizer in accordance with the invention is characterized in that a dichroic polarizer is present on the surface of the quarter-lambda plate facing away from the broadband, cholesteric polarizer. The use of a linear polarizer in accordance with this embodiment in an illumination system leads to an increase in contrast.

The invention also relates to a display device. This display device comprises an illumination system as described hereinabove as well as a display panel. Said display panel includes two transparent substrates between which a liquid-crystalline material is sandwiched, an electrode pattern and a driving means for these electrodes. An image is formed by locally applying electric fields to the liquid-crystalline material. The display device in accordance with the invention may be of the ferroelectric, anti-ferroelectric, untwisted nematic, twisted nematic or supertwisted nematic type.

These and other aspects of the invention will be apparent from and elucidated with reference to the embodiments described hereinafter.

It is noted that, for clarity, the parts of the Figures are not drawn to scale.

DESCRIPTION OF THE PREFERRED EMBODIMENTS

Figure 1:
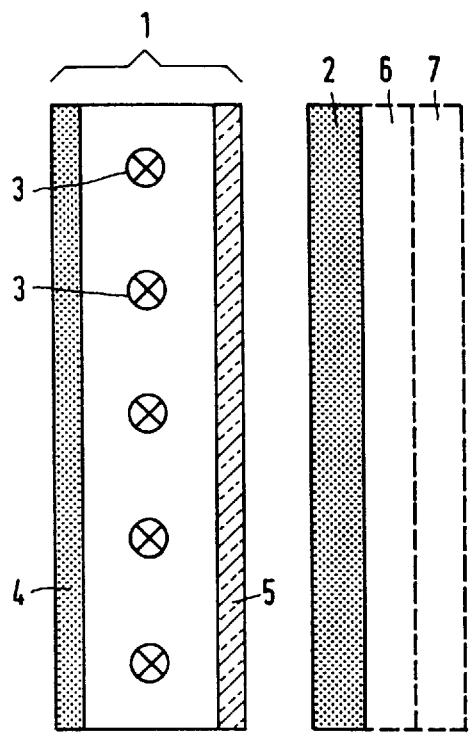
FIG. 1 is a schematic, sectional view of an embodiment of an illumination system in accordance with the invention.

FIG. 1 is a sectional, schematic view of an embodiment of the illumination system in accordance with the invention. Said system comprises a radiation source 1 and a broadband, cholesteric polarize 2. The radiation source includes five light sources 3 in the form of fluorescent lamps, a reflector 4, and a diffuser 5. It is noted that, instead of a number of separate fluorescent lamps, use can alternatively be made of a single fluorescent tube, in particular of the meander-shaped type. The unpolarized light generated via the light source(s) 3 is guided, if necessary via reflection from reflector 4, via the diffuser in the direction of the broadband polarizer. Said reflector 4 can be made of rubber filled with a white pigment such as titanium dioxide or barium sulphate. Said reflector may also consist of a metal film. The diffuser 5 may consist of a scattering foil. The radiation source 1 described herein causes the unpolarized light to be incident on the cholesteric polarizer 2 in a very uniform manner. It is noted that the expression "radiation source" is to be interpreted in a broad sense. This expression, for example, also comprises a light-guiding layer which reflects radiation, generated by means of a fluorescent lamp situated next to the illumination system, through the broadband polarizer. Said construction is also referred to as "sidelighting".

The broadband polarizer 2 comprises a layer of a polymeric material having a cholesteric order, in which the material is ordered so that the axis of the molecular helix is directed at right angles to the cholesteric layer. The pitch of the molecular helix increases from a minimum value at a first surface of the cholesteric layer to a maximum value at the second surface of the layer. In this case, the polarizer is positioned in the illumination system in such a manner that the cholesteric layer faces the radiation source with its first surface. Further, the maximum value of the pitch is selected so that it is optimally adapted to conventional fluorescent lamps. This means that the value of the product $p_{max} \cdot n_e$ of the maximum value of the pitch in the cholesteric layer $p_{max}$ and of the extraordinary refractive index $n_e$ ranges between 0.61 micron and 0.76 micron. In general, the extraordinary refractive index $n_e$ of cholesteric layers ranges from 1.6 to 1.7.

Figure 2:
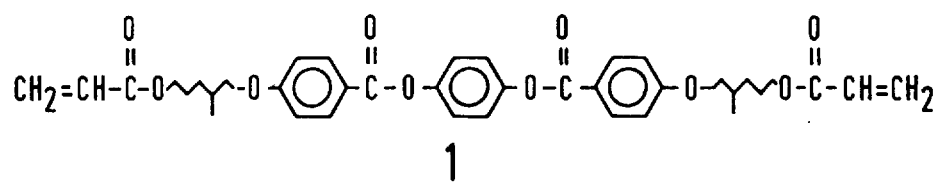
FIG. 2 shows structural formulas of compounds which can be used in the manufacture of the linear polarizer in accordance with the invention.
Figure 2:
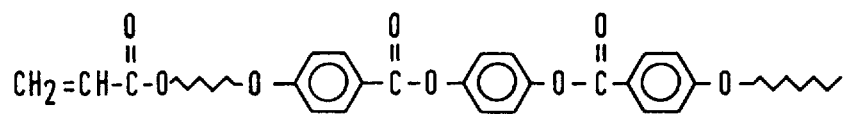
Figure 2:
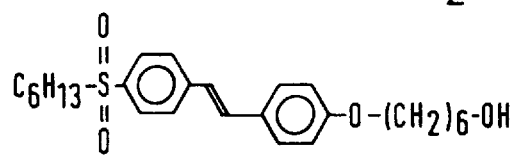
Figure 2:
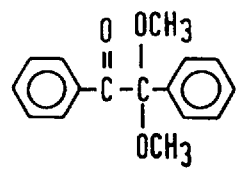

European Patent Application EP-A 606.940 describes a number of ways of manufacturing a broadband, cholesteric polarizer. In the present case, use was made of a mixture of a cholesteric diacrylate Cr70Ch92I whose structure is in accordance with formula (1) of FIG. 2, and a nematic monoacrylate Cr100N175I whose structure is in accordance with formula (2) of FIG. 2. A small quantity of a dye was added to this mixture. The chemical structure of this dye is referenced as (3) in FIG. 2. This dye has a maximum extinction of 31524 I/mol.cm at a wavelength of 334 nm. Also a small quantity of a photoinitiator (formula (4) of FIG. 2) was added. The mixture was sandwiched between two parallel substrates and subsequently cured by means of actinic radiation. During curing, a radiation profile was provided on the layer to be polymerized. By virtue thereof, a continuous variation in the pitch of the molecular helix of the cholesteric material was obtained. During curing, a three-dimensional polymeric network is formed. The molecular helix having a variable pitch is fixed by the presence of this network.

Figure 3:
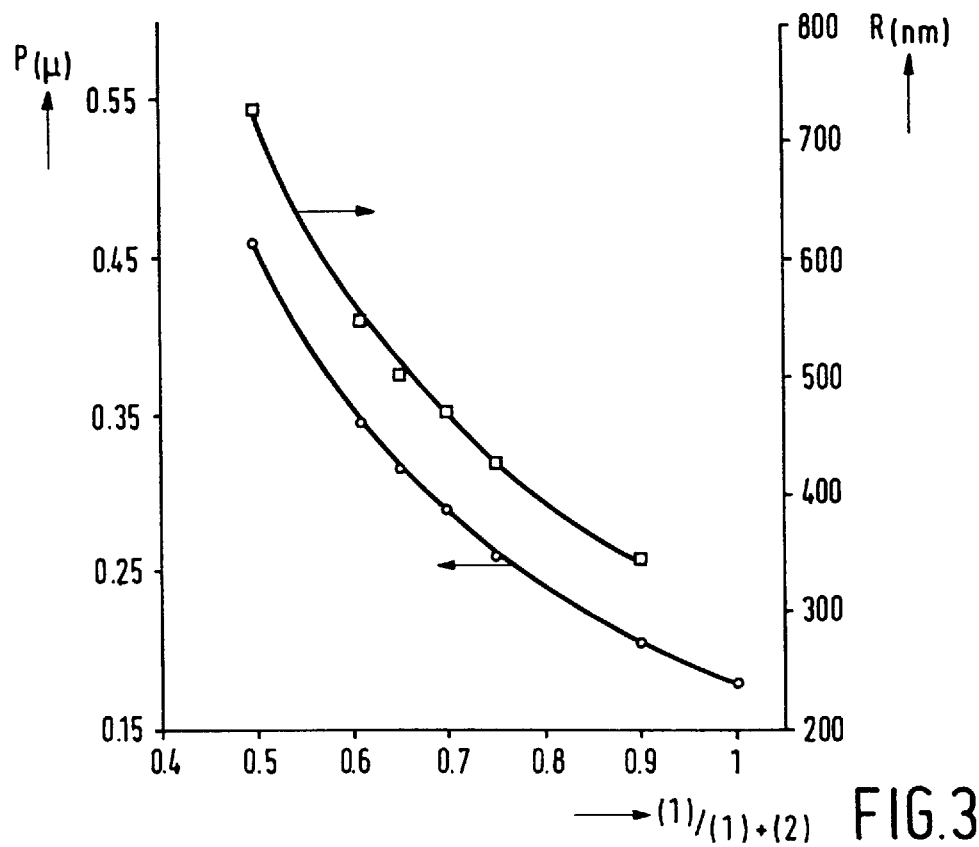
FIG. 3 shows a graph in which the pitch P and the reflection wavelength R of a cholesteric polarizer are plotted as a function of the mixing ratio of the nematic and cholesteric monomers used.

The maximum and the minimum pitch of the cholesteric layer can be adapted by changing the mixing ratio of the cholesteric and nematic monomers. FIG. 3 shows the results of experiments in which the mixing ratio of the monomers (1) and (2) is varied. In this Figure, the pitch P is plotted as a function of the quantity of monomer (1) relative to the overall quantity of monomers (1) and (2). This figure also shows the relevant reflection wavelength R. For clarity, no radiation profile was provided in this experiment during curing of the cholesteric layer. Using the data given in said Patent document EP-A 606.940, a cholesteric layer whose product $p_{max} \cdot n_e$ ranges between 0.61 micron and 0.76 micron, can be manufactured in a simple manner by those skilled in the art.

The viewing-angle dependence of an illumination system having the above-mentioned structure was checked. Said viewing-angle dependence was found to be much smaller than that of a system in which the broadband, cholesteric polarizer faces the radiation source with the surface having the largest pitch.

The illumination system in accordance with the invention preferably also comprises a quarter-lambda plate as well as a dichroic polarizer. The presence of these elements, however, is not essential for the operation of the invention. The quarter-lambda plate 6 and the dichroic polarizer 7 are also shown in FIG. 1. They are preferably incorporated in the illumination system as a three-layer structure. Said three optical components can, however, alternatively be incorporated in the system as separate elements.

An illumination system of the above-mentioned structure was subjected to a number of measurements. The broadband polarizers used for this purpose comprise a 20 micron thick layer of a cholesteric material whose structure is indicated hereinabove. In each polarizer the pitch of the molecular helix at the surface of the layer facing the light source was 0.22 micron (minimum value). At the surface facing away from the light source, the pitch of the various polarizers varied from 0.60 to 0.80 micrometers (maximum value). On this other surface of the broadband polarizers, there were provided, in succession, a quarter-lambda plate of polycarbonate and a dichroic polarizer.

Figure 4:
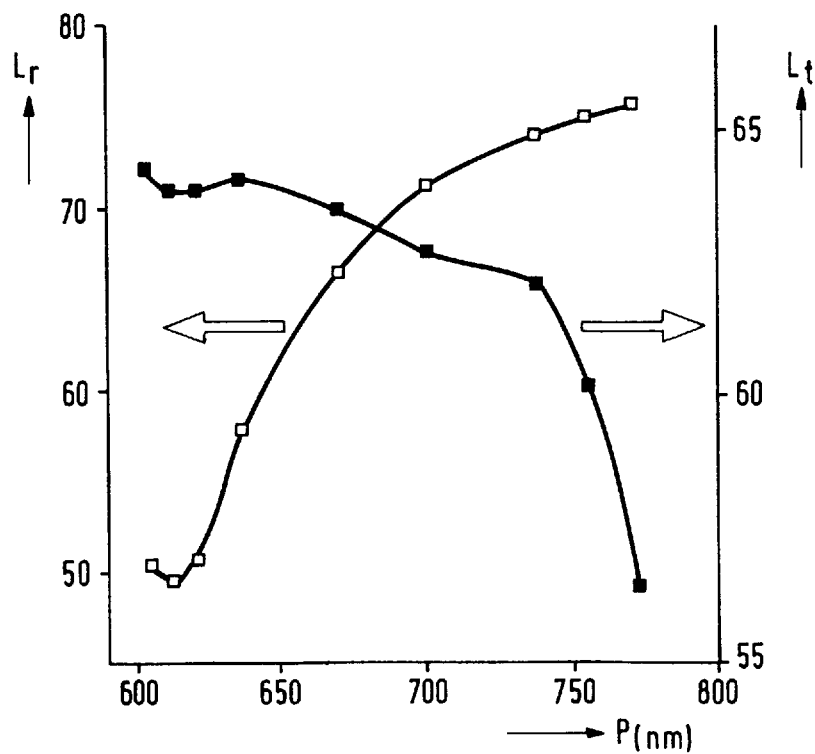
FIG. 4 shows a graph in which the minimum reflection and the minimum transmission are plotted as a function of the product $p_{max} \cdot n_e$ of a cholesteric polarizer.

In FIG. 4, the lightness of the linear polarizers described in the preceding paragraph is determined. The lightness L was determined in transmission ($L_t$) and in reflection ($L_r$) as a function of the product P (nm) of the maximum pitch in the cholesteric layer ($p_{max}$) and the extraordinary refractive index ($n_e$) of this layer. This product is equal to the maximum wavelength in the reflected spectrum for perpendicularly incident light and can thus be measured for any cholesteric reflector. For the light source, use is made of a conventional fluorescent lamp of the above-defined type.

The lightness (L) is given as psychometric lightness. This measure of lightness is constructed in such a way that variations in this quantity correspond accurately to variations as they are perceived as relevant by the human visual system. There is a nonlinear relation between the psychometric lightness and the light intensity, because the sensitivity of the human visual system to variations in intensity is not linear.

FIG. 4 shows that the minimum of lightness of the transmitted light $L_t$ decreases as the product $p_{max} \cdot n_e$ increases. This is caused by changes in the state of polarization of the light travelling through the cholesteric layer. In this respect it is noted that the value of $n_e$ is constant for the same layer. If the product $p_{max} \cdot n_e$ exceeds 0.76 micron, the lightness assumes an unacceptably low level. Preferably, this product is chosen to be smaller than 0.74 micron.

It has been found that a diminution of the product $p_{MAX} \cdot ne$ is accompanied by an increase of the viewing-angle dependence of the coloration of the reflected light $L_r$. If the value of this product is too small, the division of the unpolarized light into two beams with complementary polarization states does not take place for the red portion of the incident light. As a result, the red component of the light is not reflected and, consequently, the light which is reflected is less bright and more colored. The reflected light is depolarized and reflected again in the diffuser. Subsequently, this light is supplied again to the cholesteric layer. Now, a portion of this light is passed by the cholesteric polarizer. In this manner, an increase in coloration in the initially reflected beam becomes visible to the user of the device. It has been found that this coloration becomes unacceptable if the product $p_{max}.n_e$ is below 0.61 micron. Preferably, this product is chosen to be above 0.63 micron.

Figure 5A:
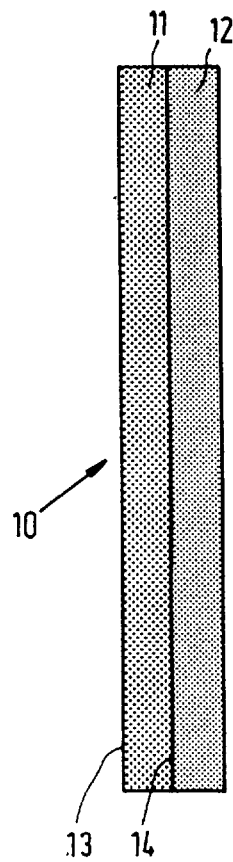
FIG. 5a and 5b are sectional views of two embodiments of a linear polarizer in accordance with the invention.
Figure 5B:
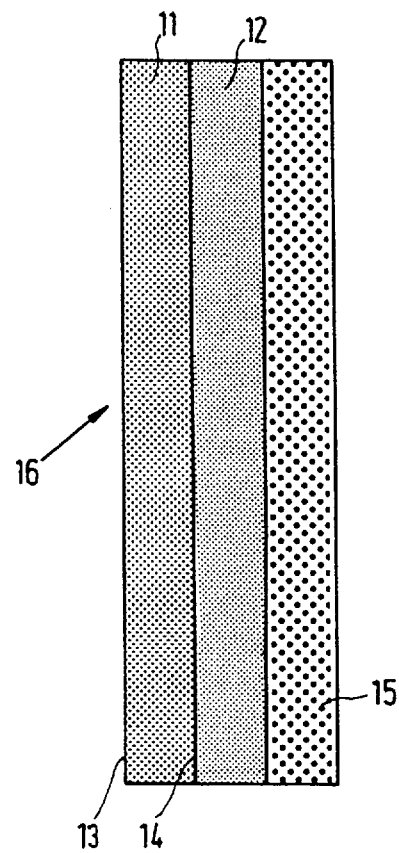

FIG. 5 shows a number of linear polarizers in accordance with the invention. The polarizer 10, shown in FIG. 5a, comprises a broadband, cholesteric polarizer 11 as well as a quarter-lambda plate 12. The broadband, cholesteric polarizer 11 includes a layer of a polymeric material having a cholesteric order. The material is ordered in such a way that the axis of the molecular helix extends at right angles to the layer. Moreover, the pitch of the molecular helix increases from a minimum value at a first surface 13 of the cholesteric layer to a maximum value at the second surface 14 of said layer. The quarter-lambda plate 12 is situated on the second surface of the polarizer.

FIG. 5-b shows another embodiment of the linear polarizer in accordance with the invention. In addition to a broadband, cholesteric polarizer 11 and a quarter-lambda plate 12, this polarizer 16 comprises a dichroic polarizer 15. This dichroic polarizer is situated on the surface of the quarter-lambda plate facing away from the cholesteric polarizer.

The linear polarizers shown in FIG. 5 can be manufactured by bonding together separate foils of a broadband, cholesteric polarizer, a quarter-lambda plate and, if necessary, a dichroic polarizer. If necessary, the cholesteric polarizer may be situated on a transparent substrate. The polarizer may alternatively be embedded between two substrates. However, it is alternatively possible to use self-supporting cholesteric polarizers. The dichroic polarizer is composed, for example, of a layer of polyvinyl alcohol (PVA), which is situated between two substrates of cellulose acetate. Said PVA layer is stretched to approximately 6 times its original length. Subsequently, it is impregnated with an iodide complex or an organic dye. The stretched PVA and the additions together form a layer which absorbs light having a polarization parallel to the direction of stretching and which passes light having a polarization which is at right angles to said direction. In the linear polarizer, the main axis of the quarter-lambda plate should enclose an angle of 45° with the direction of light transmission of the dichroic polarizer.

Figure 6:
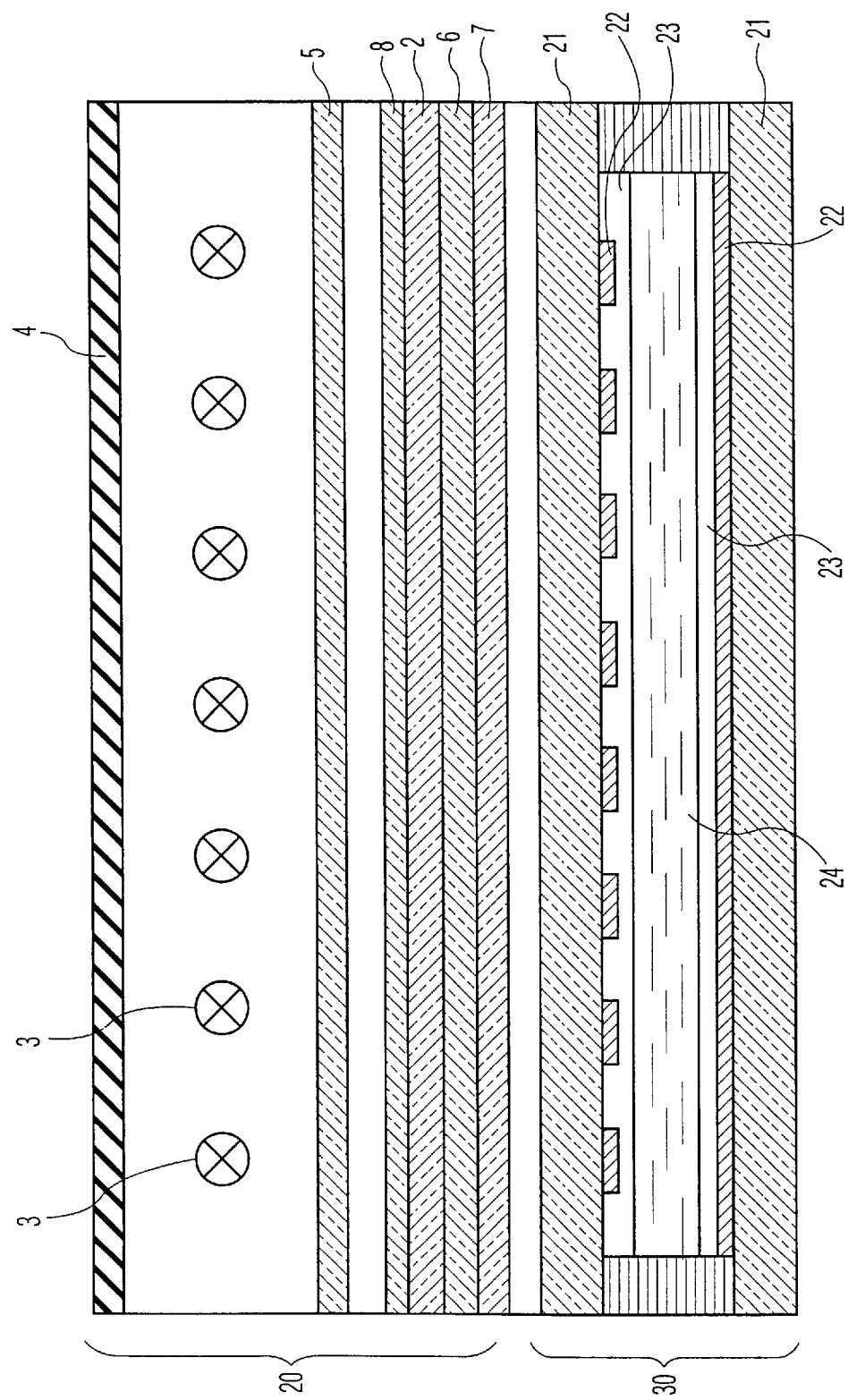
FIG. 6 is a schematic, sectional view of a display device in accordance with the invention.

FIG. 6 shows a display device in accordance with the invention. Said display device comprises an illumination system 20, as described in greater detail in FIG. 1.

The various components of this illumination system bear the same reference numerals as those of FIG. 1. The illumination system of the display device comprises a radiation source 3, in the form of a meander-shaped fluorescent lamp, a reflector 4 and a diffuser 5. The system also includes a broadband, cholesteric polarizer 2, a quarter-lambda plate 6 and a dichroic polarizer 7. In this case, they are provided as a stack on a substrate 8.

The display device also comprises a display panel 30. This panel is composed of two transparent substrates 21, which are each provided with an array of electrodes 22 and an orientation layer 23. The electrodes consist of a transparent, electroconductive material such as indium-tin oxide (ITO). The orientation layers may be made of a rubbed polymeric material such as polyimide or PVA, or of obliquely sputtered silicon oxide. Finally, a layer 24 of smectic or nematic liquid crystalline material is situated between the substrates. The order of this material can be influenced by electric fields which can be generated locally by means of electrodes. The display device also includes an electronic driving means for these electrodes. For clarity, this driving means is not shown in the Figure.

It is of essential importance for the effectiveness of the invention that the display device comprises a broadband, cholesteric polarizer, which is properly oriented. The surface of the polarizer where the pitch of the cholesteric material is smallest must be directed towards the fluorescent lamp(s). The maximum and the minimum value of the product $p_{max}.n_e$ of the maximum pitch $p_{max}$ and of the extraordinary refractive index $n_e$ should be at least 0.61 micron and maximally 0.76 micron. Polarizers which meet this requirement provide the display device with a surprisingly low viewing-angle dependence of the lightness and the color.

We claim:

1. An illumination system comprising a fluorescent lamp and a broadband, cholesteric polarizer, characterized in that an illumination system which comprises a fluorescent lamp and a broadband, cholesteric polarizer with a layer of a polymeric material having a cholesteric order, said material being ordered in such a manner that the axis of the molecular helix extends at right angles to the layer, and the pitch the molecular helix increasing from a minimum value at a first surface of the cholesteric layer to a maximum value at the second surface of the layer, characterized in that the polarizer is positioned in the illumination system so that the cholesteric layer faces the radiation source with its first surface and that the value of the product $p_{max}.n_e$ of the maximum value of the pitch in the cholesteric layer $p_{max}$ and of the extraordinary refractive index $n_e$ ranges between 0.61 micron and 0.76 micron.

2. An illumination system as claimed in claim 1, characterized in that the illumination system also comprises a quarter-lambda plate which is situated on the side of the polarizer facing away from the fluorescent lamp.

3. An illumination system as claimed in claim 2, characterized in that the quarter-lambda plate is situated on the second surface of the broadband polarizer.

4. A linear polarizer which can suitably be used in an illumination system as claimed in claim 3, comprising a broadband, cholesteric polarizer as well as a quarter-lambda plate, which polarizer includes a layer of a polymeric material having a cholesteric order, which material is ordered in such a manner that the axis of the molecular helix is directed at right angles to the layer, and the pitch of the molecular helix increases from a minimum value at a first surface of the cholesteric layer to a maximum value at the second surface of the layer, and the quarter-lambda plate is situated on the second surface of the polarizer, and the value of the product $p_{max}.n_e$ of the maximum value of the pitch in the cholesteric layer $p_{max}$ and of the extraordinary refractive index $n_e$ ranges between 0.61 micron and 0.76 micron.

5. A linear polarizer as claimed in claim 4, characterized in that the quarter-lambda plate is made of a foil of an oriented polymeric material.

6. A linear polarizer as claimed in claim 5, characterized in that a dichroic polarizer is present on the surface of the quarter-lambda plate facing away from the broadband, cholesteric polarizer.

7. An illumination system as claimed in claim 3, characterized in that the quarter-lambda plate is made of a foil of oriented polymeric material.

8. An illumination system as claimed in claim 3, characterized in that the illumination system also comprises a dichroic polarizer which is situated on the side of the quarter-lambda plate facing away from the broadband, cholesteric polarizer.

9. A display device comprising an illumination system as well as a display panel, characterized in that an illumination system as claimed in claim 3 is used.

10. An illumination system as claimed in claim 2, characterized in that the quarter-lambda plate is made of a foil of oriented polymeric material.

11. An illumination system as claimed in claim 10, characterized in that the illumination system also comprises a dichroic polarizer which is situated on the side of the quarter-lambda plate facing away from the broadband, cholesteric polarizer.

12. A linear polarizer which can suitably be used in an illumination system as claimed in claim 10, comprising a broadband, cholesteric polarizer as well as a quarter-lambda plate, which polarizer includes a layer of a polymeric material having a cholesteric order, which material is ordered in such a manner that the axis of the molecular helix is directed at right angles to the layer, and the pitch of the molecular helix increases from a minimum value at a first surface of the cholesteric layer to a maximum value at the second surface of the layer, and the quarter-lambda plate is situated on the second surface of the polarizer, and the value of the product $p_{max}.n_e$ of the maximum value of the pitch in the cholesteric layer $p_{max}$ and of the extraordinary refractive index $n_e$ ranges between 0.61 micron and 0.76 micron.

13. A display device comprising an illumination system as well as a display panel, characterized in that an illumination system as claimed in claim 10 is used.

14. An illumination system as claimed in claim 2, characterized in that the illumination system also comprises a dichroic polarizer which is situated on the side of the quarter-lambda plate facing away from the broadband, cholesteric polarizer.

15. An illumination system as claimed in claim 14, characterized in that the dichroic polarizer is situated on the quarter-lambda plate.

16. A linear polarizer which can suitably be used in an illumination system as claimed in claim 15, comprising a broadband, cholesteric polarizer as well as a quarter-lambda plate, which polarizer includes a layer of a polymeric material having a cholesteric order, which material is ordered in such a manner that the axis of the molecular helix is directed at right angles to the layer, and the pitch of the molecular helix increases from a minimum value at a first surface of the cholesteric layer to a maximum value at the second surface of the layer, and the quarter-lambda plate is situated on the second surface of the polarizer, and the value of the product $p_{max}.n_e$ of the maximum value of the pitch in the cholesteric layer $p_{max}$ and of the extraordinary refractive index $n_e$ ranges between 0.61 micron and 0.76 micron.

17. A linear polarizer which can suitably be used in an illumination system as claimed in claim 14, comprising a broadband, cholesteric polarizer as well as a quarter-lambda plate, which polarizer includes a layer of a polymeric material having a cholesteric order, which material is ordered in such a manner that the axis of the molecular helix is directed at right angles to the layer, and the pitch of the molecular helix increases from a minimum value at a first surface of the cholesteric layer to a maximum value at the second surface of the layer, and the quarter-lambda plate is situated on the second surface of the polarizer, and the value of the product $p_{max}.n_e$ of the maximum value of the pitch in the cholesteric layer $p_{max}$ and of the extraordinary refractive index $n_e$ ranges between 0.61 micron and 0.76 micron.

18. A display device comprising an illumination system as well as a display panel, characterized in that an illumination system as claimed in claim 2 is used.

19. A display device comprising an illumination system as well as a display panel, characterized in that an illumination system as claimed in claim 1 is used.

* * * * *